April 10, 1934.  S. V. CORONA  1,954,726
TOOL
Filed Feb. 8, 1933
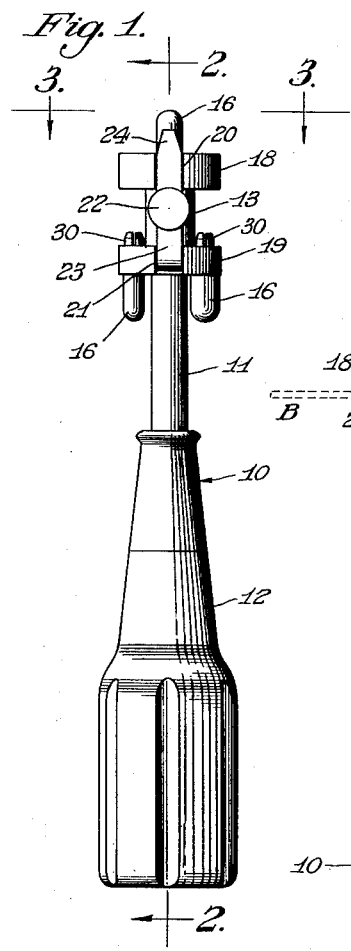
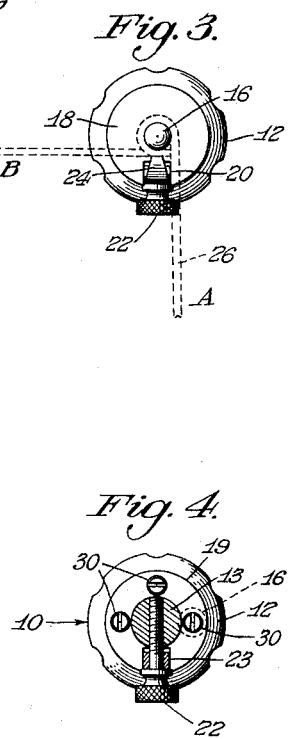
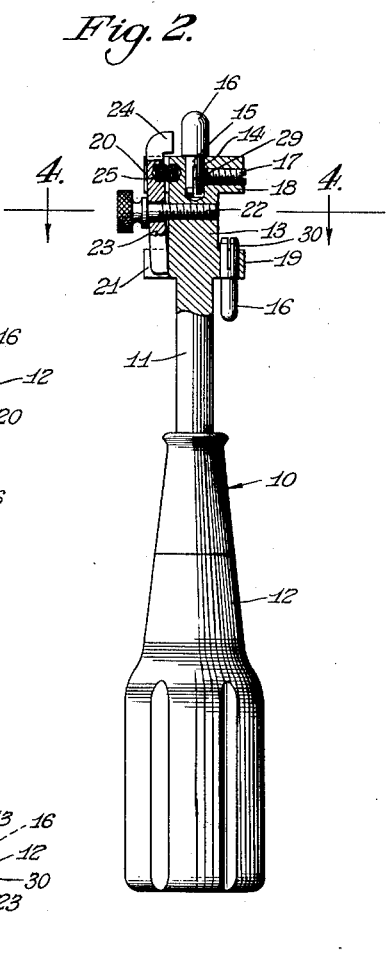
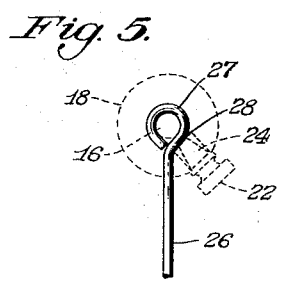
Samuel V. Corona.
INVENTOR
BY Victor J. Evans & Co.
HIS ATTORNEYS Patented Apr. 10, 1934

1,954,726

UNITED STATES PATENT OFFICE 1,954,726

TOOL

Samuel V. Corona, Chicago, Ill.

Application February 8, 1933, Serial No. 655,823

4 Claims. (Cl. 140—124)

This invention relates to certain novel improvements in tools.

An object of this invention is to provide a new and improved electrician's tool for forming eyelets in wire.

Another object of the invention is to construct the tool so that it may be readily accommodated to wires of different sizes or diameters.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a plan view of the new tool;

Fig. 2 is a view partly in section on line 2—2 in Fig. 1;

Fig. 3 is an end plan view on line 3—3 in Fig. 1, partly elevational and partly schematic;

Fig. 4 is a transverse sectional view on line 4—4 in Fig. 2; and

Fig. 5 is a view, partly in elevation and partly schematic, showing a specimen of the work formed by the tool and illustrating the operation of forming the same.

The new tool is generally indicated at 10 in the drawing and includes a stem 11 having a handle 12 thereon. Formed on the stem 11 is a chuck 13 having a socket 14 formed in the outer end thereof for reception of the stem 15 of a forming spindle 16. The spindle 16 is held on the chuck by a set screw 17. The set screw 17 is mounted in a flange 18 of the chuck 13 and the inner end of the set screw is arranged for bearing engagement against the stem 15 of the spindle 16 disposed in the socket 14.

Formed on the chuck 13, inwardly of and spaced from the flange 18, is a second flange 19, and formed in the flanges 18 and 19 is a pair of aligned guide slots 20 and 21, respectively. Mounted in the chuck 13 is a second set screw 22 and adjustably mounted on the set screw 22 for adjustable movement in the guide slots 20 and 21 is a gauge member 23. The gauge member 23 has a head portion 24 that is urged away from the head of the spindle 16 by a spring 25 that is disposed between the chuck 13 and gauge member 23.

A specimen of the work in the form of a wire 26, having an eyelet 27 formed therein, is shown in Fig. 5.

To form an eyelet 27 of a preselected size or diameter in wire 26 of a preselected size or diameter, a spindle 16, having a head corresponding in diameter to the inside diameter of the eyelet 27, is inserted into the socket 14 in the chuck 13 and secured therein by adjusting the set screw 17. The gauge member 23 is then adjusted, by means of the set screw 22, until the head 24 of the gauge member is properly spaced from the head of the spindle 16 a distance corresponding to the size or diameter of the wire 26. The wire 26 is then inserted between the head 24 of the gauge member 23 and the head of the spindle 16. The wire is then wrapped around the head of the spindle 16 either by holding the wire in one hand and manipulating the handle 12 of the tool with the other or vice versa, until the work or wire 26 assumes position "A", Fig. 3. The work is then lifted and rotated on the spindle head into position "B", Fig. 3. The stem of the wire 26 is then bent (counterclockwise, Fig. 3), using the head 24 as a fulcrum while holding the tool 12 from rotating, and thus the curved neck 28 is formed in the work where the stem of the same merges into the formed eyelet 27.

The stem 15 of each of the spindles 16 is split or slotted, as at 29, thereby forming in each spindle stem a pair of yieldable jaws 30. This yieldability of the jaws 30 facilitates their retention in the chuck socket 14 and readily permits of mounting a stock of spindles of different sizes in apertures formed in the flange 19 so that eyelets 27 of different sizes may be formed in the work by selecting from the stock held in the flange 19 a spindle having a head of the size of the desired eyelet 27.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A wire forming tool, comprising a tool body including a chuck, a spindle mounted in the chuck, a gauge member mounted on the chuck for adjustment relative to the spindle, means urging the gauge member away from the spindle, and means for adjusting the gauge member on the chuck against the action of said urging means.

2. A wire forming tool, comprising a tool body including a chuck having a socket formed therein, a forming spindle having a stem removably mounted in the socket, a gauge member mounted on the chuck for adjustment relative to the spindle, means arranged between the chuck and gauge member for urging the latter away from the spindle, and means for adjusting the gauge member on the chuck against the action of said urging means.

3. A wire forming tool, comprising a tool body including a chuck having a socket formed therein, a forming spindle having a stem removably mounted in the socket, means mounted in the chuck for releasably clamping the spindle stem in the socket, a gauge member mounted on the chuck for adjustment relative to the spindle, means for urging one end portion of the gauge member away from the spindle and means for adjusting the said end portion of the gauge member on the chuck against the action of said urging means.

4. A wire forming tool, comprising a tool body including a chuck, a forming spindle mounted in the chuck, a gauge member adjustably mounted on the chuck having a head for adjustment relative to the spindle, means urging said head away from the spindle, and means for adjusting the said head of the gauge member on the chuck against the action of said urging means.

SAMUEL V. CORONA.